(12) United States Patent
Li et al.

(10) Patent No.: US 11,268,554 B2
(45) Date of Patent: Mar. 8, 2022

(54) NUT FASTENER

(71) Applicant: Illinois Tool Works Inc., Glenview, IL (US)

(72) Inventors: Zhilin Li, Shanghai (CN); Haijie Yu, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 210 days.

(21) Appl. No.: 16/575,955

(22) Filed: Sep. 19, 2019

(65) Prior Publication Data

US 2020/0096028 A1 Mar. 26, 2020

(30) Foreign Application Priority Data

Sep. 21, 2018 (CN) .......................... 201811109524.9

(51) Int. Cl.
*F16B 5/02* (2006.01)
*F16B 33/00* (2006.01)

(52) U.S. Cl.
CPC .......... *F16B 5/0283* (2013.01); *F16B 5/0233* (2013.01); *F16B 33/006* (2013.01)

(58) Field of Classification Search
CPC .............................. F16B 5/0233; F16B 33/006
USPC ......................................... 411/546, 900–903
See application file for complete search history.

(56) References Cited

U.S. PATENT DOCUMENTS

| | | | |
|---|---|---|---|
| 6,585,447 B2 * | 7/2003 | Schwarzbich | F16B 5/0233 403/299 |
| 6,789,993 B2 * | 9/2004 | Ozawa | F16B 5/0233 411/432 |
| 7,025,552 B2 * | 4/2006 | Grubert | F16B 5/025 403/409.1 |
| 8,561,265 B2 * | 10/2013 | Benedetti | F16B 21/086 24/297 |
| 8,764,337 B2 * | 7/2014 | Binder | F16B 5/0233 403/343 |
| 8,966,738 B2 * | 3/2015 | Staley | F16B 5/0233 29/525.02 |
| 9,302,716 B2 * | 4/2016 | Sahi | F16B 5/0635 |
| 10,544,816 B2 * | 1/2020 | Arisa Busquets | F16B 5/0233 |
| 10,926,810 B2 * | 2/2021 | Arisa Busquets | B62D 27/065 |
| 2017/0276165 A1 * | 9/2017 | Matsunami | F16B 5/0233 |

* cited by examiner

Primary Examiner — Flemming Saether
(74) Attorney, Agent, or Firm — Quarles & Brady LLP

(57) ABSTRACT

The present application provides a nut fastener, comprising a mounting nut and an adjustment bolt. The mounting nut comprises retaining arms and a nut receiving passage. The adjustment bolt is configured to be at least partially received in the nut receiving passage and comprises a bolt receiving passage. A bushing is arranged in the bolt receiving passage of the adjustment bolt and over molded onto a side wall of the bolt receiving passage by means of two-shot injection molding. The nut fastener in the present application is easy to mount and use.

20 Claims, 8 Drawing Sheets

NUT FASTENER

RELATED APPLICATIONS

This application claims the benefit of Chinese Patent Application No. 201811109524.9, filed Sep. 21, 2018, which is hereby incorporated by reference in its entirety.

TECHNICAL FIELD

The present application relates to a nut fastener, and in particular to a compensating nut fastener configured to adapt to a gap between components, e.g., panels.

BACKGROUND

In various industrial applications, components are connected together by using fasteners. In some applications, there may be a gap between the components. For example, two panels can be separated by a gap, and portions of other components may remain in the gap.

Therefore, a need exists for a fastener that adapts to or compensates for the gap between the components.

SUMMARY

In order to solve the above problems, the present application provides a fastener, comprising a mounting nut comprising retaining arms and a nut receiving passage and an adjustment bolt. The adjustment bolt is configured to be at least partially received in the nut receiving passage. The adjustment bolt comprises a bolt receiving passage. A bushing is arranged in the bolt receiving passage, and the bushing is overmolded onto a side wall of the bolt receiving passage by means of two-shot injection molding.

According to an embodiment of the nut fastener as described above, the adjustment bolt comprises a support flange which is arranged at one end of the adjustment bolt and extends outwards from an outer surface of the adjustment bolt. The bushing comprises a flanged edge which at least partially covers a support surface of the support flange of the adjustment bolt.

According to an embodiment of the nut fastener as described above, the bushing is provided with a cavity, and the cavity is configured for receiving a mounting tool or a fastener.

According to an embodiment of the nut fastener as described above, the bushing is made of a thermoplastic elastomer.

According to an embodiment of the nut fastener as described above, the support flange is provided with at least one hole, and the flanged edge comprises at least one retaining portion which extends through the at least one hole.

According to an embodiment of the nut fastener as described above, an inner wall of the bolt receiving passage is provided with at least one projecting portion, and the projecting portion is embedded in the bushing during the injection molding of the bushing.

According to an embodiment of the nut fastener as described above, an inner wall of the bolt receiving passage is provided with at least one groove, and a wall of the bushing is embedded in the groove during the injection molding of the bushing.

According to an embodiment of the nut fastener as described above, an inner side of the retaining portion is provided with a groove, and an outer side wall of the mounting nut is provided with a bump capable of entering the groove to prevent rotation between the mounting nut and the adjustment bolt.

According to an embodiment of the nut fastener as described above, an edge of the support flange has a pair of straight sides arranged opposite to each other.

According to an embodiment of the nut fastener as described above, the nut receiving passage has an internal thread, an outer wall of the adjustment bolt has an external thread, and the adjustment bolt is received in the nut receiving passage via a thread fit.

According to an embodiment of the nut fastener as described above, the mounting nut is configured to be mounted on a first panel by means of the retaining arms, and the nut fastener can support the first panel and a second panel by means of the adjustment bolt rotating with respect to the mounting nut.

The nut fastener provided by the present application can provide an appropriate tension force between two panels, is readily removable, and can provide a waterproof function and also prevent two components of the nut fastener from rotating and being separated from each other during transportation.

DETAILED DESCRIPTION

Various particular embodiments of the present application are described below with reference to the accompanying drawings which constitute part of the specification. It should be understood that although directional terms such as "front," "rear," "upper," "lower," "left," "right" or the like may be used in the present application to describe various exemplary structural parts and elements in the present application, these terms used herein are merely for the purpose of easy description and are determined based on the exemplary orientations shown in the accompanying drawings. Since the embodiments disclosed in the present application can be arranged in different directions, these directional terms are only illustrative and should not be considered as limitations.

Figure 1:
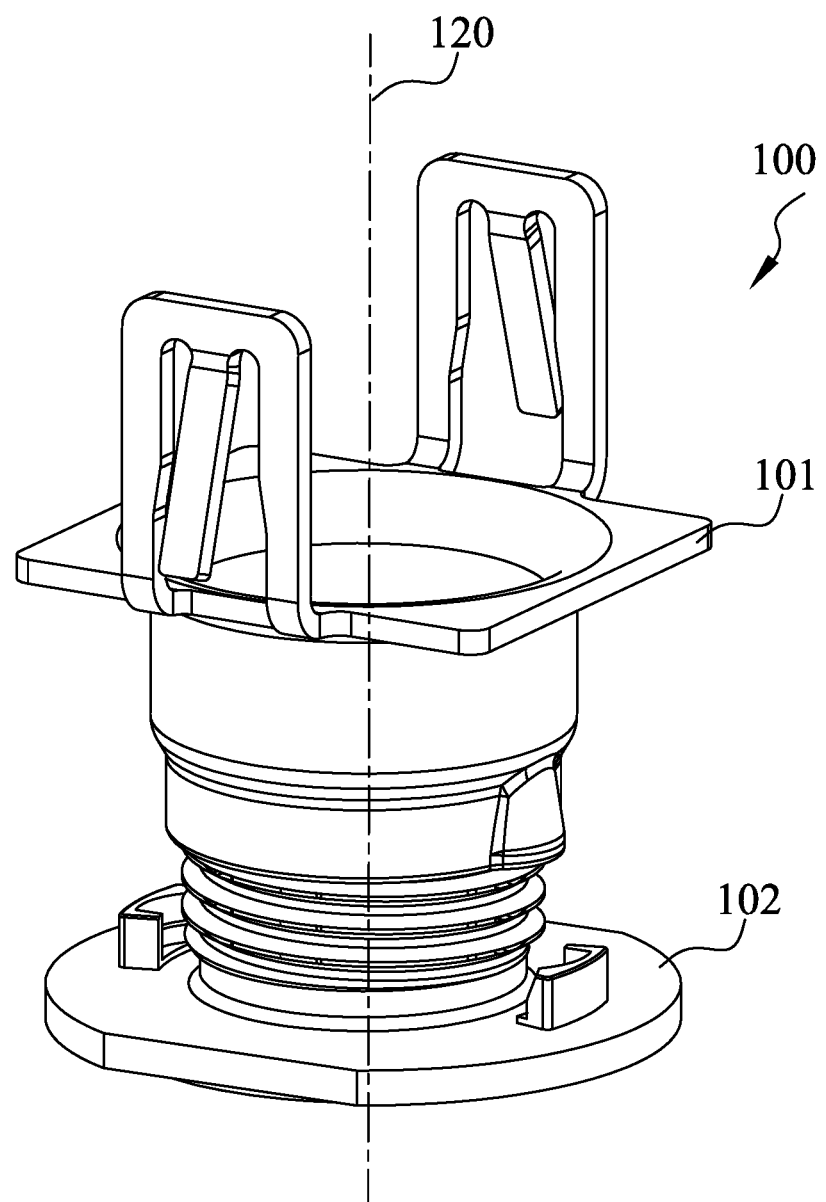
FIG. 1 is a perspective view of one embodiment of a nut fastener of the present application.

FIG. 1 is a perspective view of one embodiment of a nut fastener of the present application. As shown in FIG. 1, a nut fastener 100 comprises a mounting nut 101 and an adjustment bolt 102, and the adjustment bolt 102 is rotatable with respect to the mounting nut 101 so as to adjust a length of the nut fastener 100. The nut fastener 100 has a central axis 120.

Figure 2:
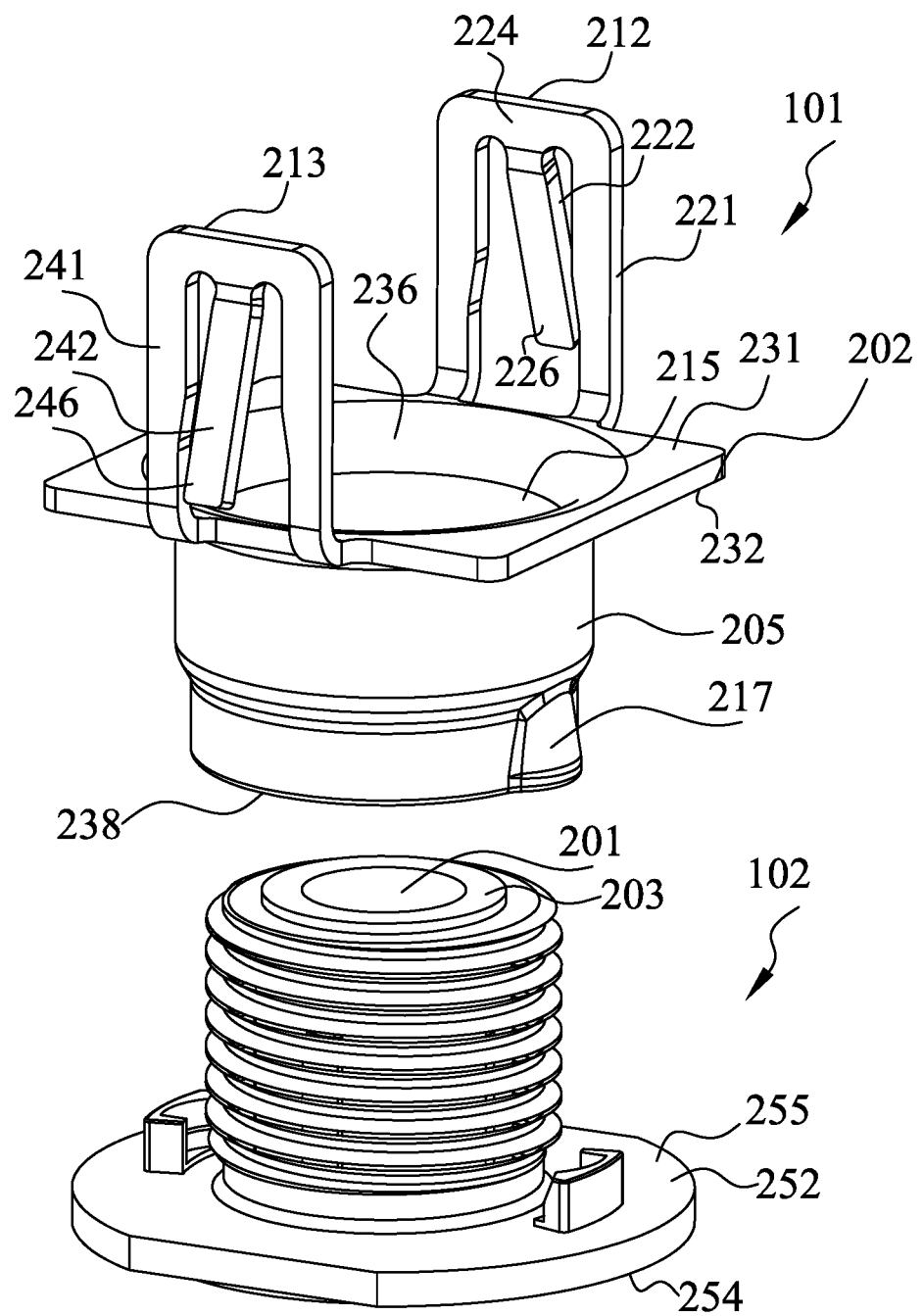
FIG. 2 is an exploded schematic view of the nut fastener in FIG. 1.

FIG. 2 is an exploded view of the nut fastener in FIG. 1 for separately showing the specific structures of the mounting nut 101 and the adjustment bolt 102.

As shown in FIG. 2, the mounting nut 101 comprises a substrate 202, a sleeve 205, a first retaining arm 212 and a second retaining arm 213. The substrate 202 comprises an upper surface 231 and a lower surface 232. The sleeve 205 extends through the substrate 202, and the sleeve 205 has an upper opening 236 in the upper surface 231 of the substrate 202, and a lower opening 238 below the lower surface 232 of the substrate 202. An inner wall of the sleeve 205 has an internal thread (not shown) to form a nut receiving passage 215. In one embodiment of the present application, the substrate 202 is substantially square, and the first retaining arm 212 and the second retaining arm 213 are formed to extend upwards from opposite two side edges of the substrate 202, respectively. The first retaining arm 212 and the second retaining arm 213 are structurally symmetrical to each other, and the structures of the two retaining arms will be described below by taking the first retaining arm 212 as an example. The first retaining arm 212 comprises a support portion 221 and an offset portion 222, wherein the support portion 221 is a U-shaped structure opened at a lower end, the U-shaped structure is hollow and has a bottom portion 224 located at a top end of the U-shaped structure, and the offset portion 222 extends downwards and outwards from the bottom portion 224 to form a free end 226. The joint between the offset portion 222 and the bottom portion 224 is resilient so that the free end 226 of the offset portion 222 can deflect inwards. Similarly, the second retaining arm 213 has a support portion 241 and an offset portion 242, and the offset portion 242 has a free end 246.

The outer surface of the adjustment bolt 102 is provided with an external thread for engaging with the internal thread of the mounting nut 101, so that the adjustment bolt 102 can be screwed into the mounting nut 101 from the lower opening 238 of the sleeve 205 and enter the nut receiving passage 215, and enable the length of the nut fastener 100 to be changed by rotating the adjustment bolt 102 with respect to the mounting nut 101. The lower end of the adjustment bolt 102 is provided with a support flange 252 formed by extending outwards from the outer surface thereof, and the support flange 252 has a support surface 254 and an inner surface 255 opposite to the support surface 254. The support surface 254 of the support flange 252 is configured to support a panel to be mounted (e.g., the panel 702 shown in FIG. 7). A bolt receiving passage 201 is provided inside the adjustment bolt 102. The bolt receiving passage 201 is formed to pass through the adjustment bolt 102 in an axial direction of the adjustment bolt 102. The bolt receiving passage 201 has a side wall 410 (see FIG. 4). A bushing 203 is provided in the bolt receiving passage 201, and the bushing 203 is overmolded onto the side wall 410 of the bolt receiving passage 201 by means of a two-shot injection molding process. For example, a metal body of the adjustment bolt not including the bushing is loaded on a mold, a melted plastic material is then poured into a space between the mold and the metal body of the adjustment bolt, and after the plastic material is cured, the bushing 203 is formed. In the present application, the bushing 203 is made of an elastic material, e.g., thermoplastic elastomer.

Figure 3A:
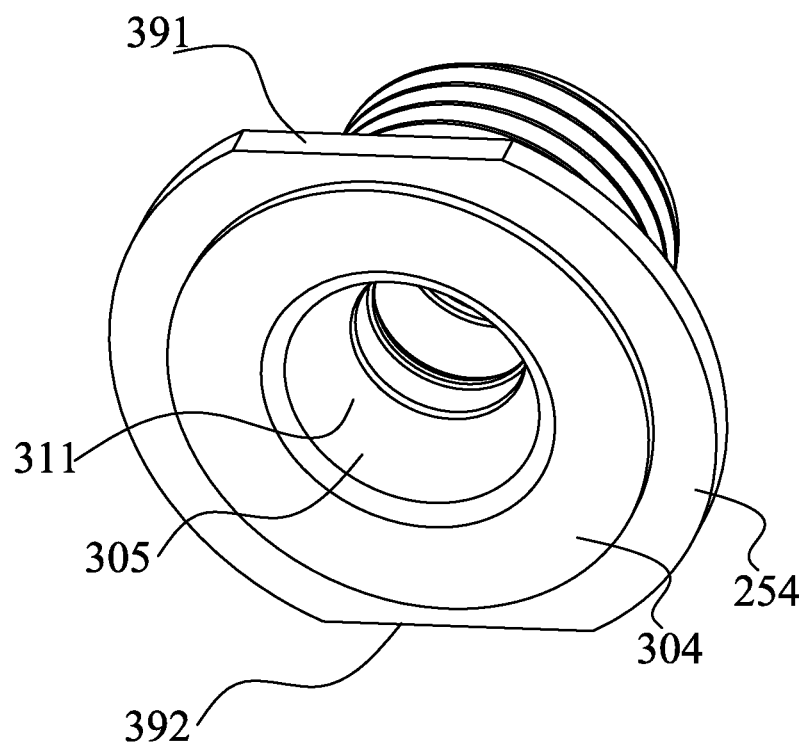
FIG. 3A is a perspective view of the adjustment bolt in FIG. 2 from an angle.
Figure 3B:
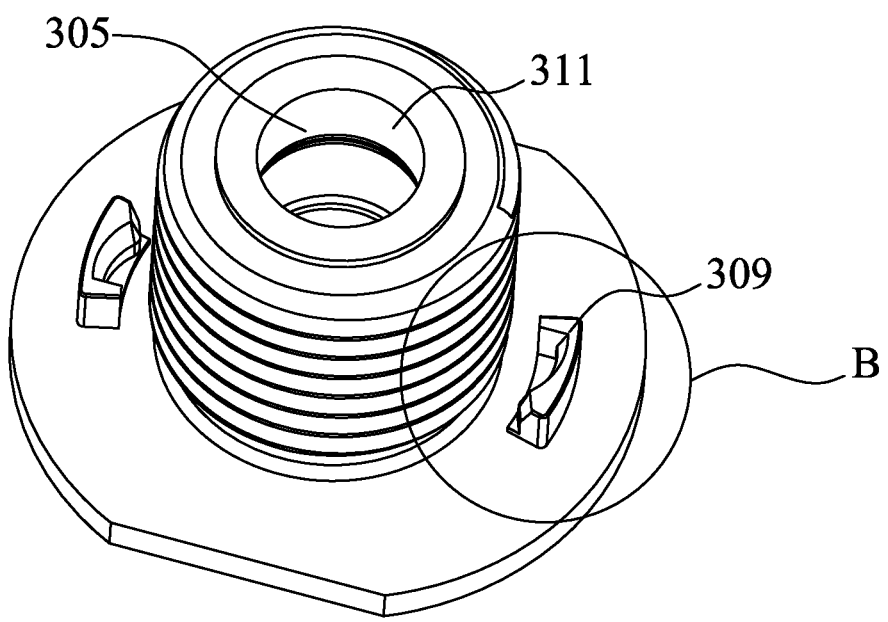
FIG. 3B is a perspective view of the adjustment bolt in FIG. 2 from another angle.

FIGS. 3A and 3B show the adjustment bolt 102 from two angles, respectively. As shown in FIG. 3A, the bushing 203 has a cylindrical cylinder portion 311 and a flanged edge 304 formed by extending outwards from one end of the cylinder portion 311. The flanged edge 304 can cover or partially cover the support surface 254 of the support flange 252 of the adjustment bolt 102. In the embodiment shown in FIG. 3A, the flanged edge 304 partially covers the support surface 254. Of course, in other embodiments the flanged edge 304 may also completely cover the support surface 254. The flanged edge 304 tightly abuts against the support surface 254 of the support flange 252 such that when the nut fastener 100 is mounted in place between the two panels, the flanged edge 304 can be in contact with the panel supported by the adjustment bolt 102. A cavity 305 is formed at the center of the bushing 203, and the cavity 305 allows a mounting tool, e.g., a fastener, to pass through.

The support flange 252 further has a pair of straight sides 391 and 392, and the straight sides 391 and 392 are symmetrically arranged with respect to the central axis of the adjustment bolt 102. The central axis of the adjustment bolt 102 coincides with the central axis 120 of the nut fastener 100. When the nut fastener 100 needs to be removed, a tool can be used to clamp the pair of straight sides 391 and 392 so that the tool can stably clamp the adjustment bolt 102. Of course, having one straight side or more straight sides may also have a similar technical effect.

As shown in FIG. 3B, the support flange 252 of the adjustment bolt 102 has a hole 470 (see FIG. 4), and the flanged edge 304 of the bushing 203 has a retaining portion 309 that can be received by the hole 470. The retaining portion 309 extends out from the inner surface of the flanged edge 304 (i.e., the surface that faces the support flange 252). In this embodiment, a pair of holes 470 and a pair of retaining portions 309 are shown, and in other embodiments, one or more holes 470 and one or more retaining portions 309 may be provided, respectively.

Figure 4:
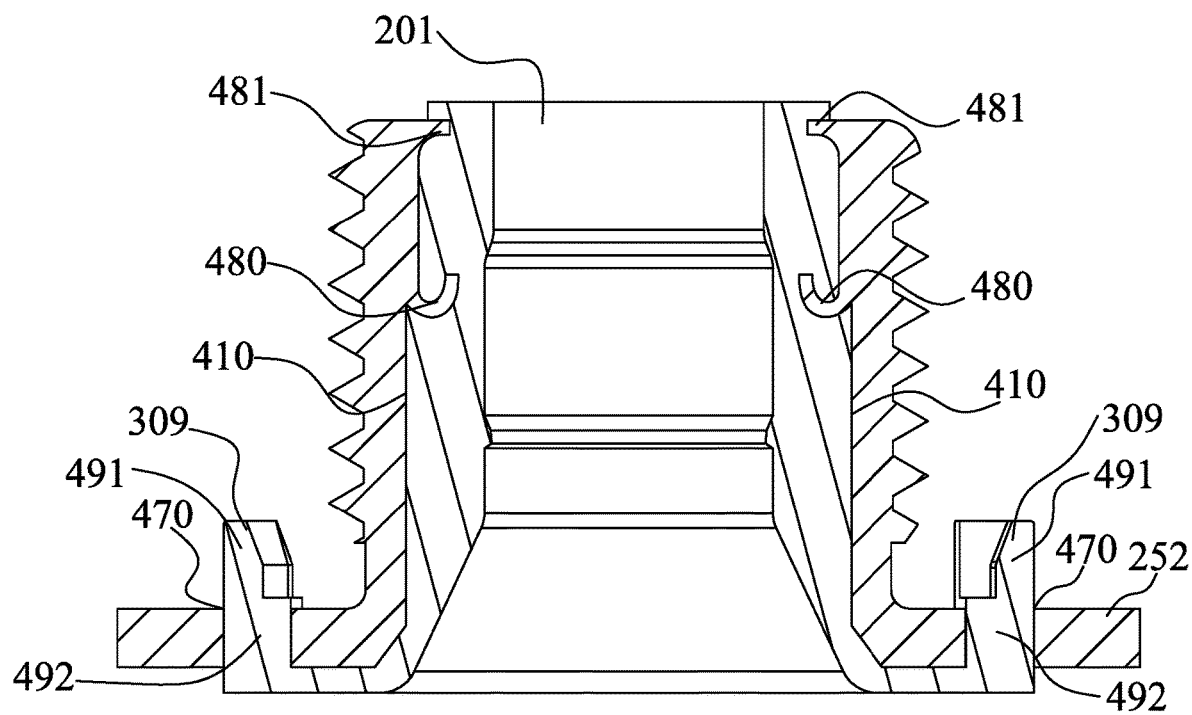
FIG. 4 is an axial cross-sectional view of the adjustment bolt in FIG. 3A.

FIG. 4 is a cross-sectional view of the adjustment bolt 102 in FIG. 3B in its axial direction. As shown in FIG. 4, the retaining portions 309 on the flanged edge 304 of the bushing 203 pass through the holes 470 in the support flange 252 of the adjustment bolt 102. The retaining portion 309 has a waist 492 located inside the hole 470 and a head 491 located outside the hole 470. The head 491 is configured to be slightly larger in size than the hole 470 so as to prevent, by means of the head 491, the retaining portion 309 from releasing from the hole 470. The retaining portion 309 can also prevent the adjustment bolt 102 from sliding with respect to the mounting nut 101 during transportation, the content of which will be described in detail below.

Still as shown in FIG. 4, the side wall 410 of the bolt receiving passage 201 of the adjustment bolt 102 is provided with at least one projecting portion 480 formed by extending inwards. During the process of the bushing 203 being molded on the side wall 410 of the bolt receiving passage 201 of the adjustment bolt 102, as the bushing 203 is cured and formed, the projecting portion 480 is embedded inside the bushing 203, so that the bushing 203 can be prevented from moving with respect to the side wall 410 of the bolt receiving passage 201 of the adjustment bolt 102. The projecting portion 480 shown in FIG. 4 is located in the middle portion of the side wall 410, and extends inwards and downwards first and then extends inwards and upwards so as to form a hook shape. However, in other embodiments, the projecting portion 480 may be of other shapes and also may be located at other positions of the side wall 410 as long as it can be embedded inside the bushing 203. In this embodiment, one end of the side wall 410 opposite to the flanged edge 304 is further provided with a projecting portion 481, and the projecting portion 481 extends inwards so that it can be embedded inside the bushing 203. The projecting portion 480, the projecting portion 481, and the retaining portion 309 collectively reinforce the degree of firmness of the bushing 203 coupled onto the adjustment bolt 102 so as to prevent the bushing 203 from releasing from the adjustment bolt 102 during mounting and dismounting the nut fastener 100. In this embodiment, four projecting portions 480 are provided and evenly distributed on the same circumference of the side wall 410. In other embodiments, there may be any number of the projecting portions 480. In this embodiment, the projecting portions 481 are continuously distributed on the same circumference of the side wall 410 so that an annular projection is formed. In other embodiments, the projecting portion 481 may also be any number of separate projecting portions, and be distributed elsewhere in the side wall 410.

Figure 5:
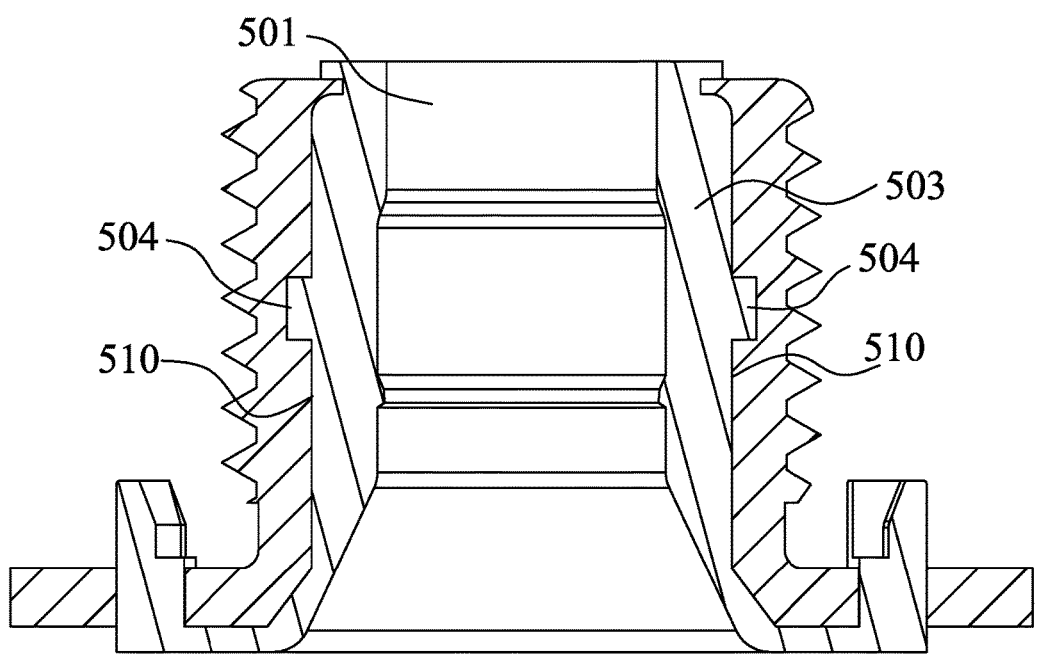
FIG. 5 is an axial cross-sectional view of an adjustment bolt of another embodiment of the nut fastener of the present application.

FIG. 5 is an axial cross-sectional view of an adjustment bolt of another embodiment of the nut fastener of the present application. The adjustment bolt of this embodiment is substantially the same as the adjustment bolt of the embodiment shown in FIG. 4. The difference only lies in that the adjustment bolt of the embodiment shown in FIG. 4 is fitted with the bushing 203 by means of a hook arranged on the side wall 410 of its receiving passage 201, whereas the adjustment bolt of the embodiment shown in FIG. 5 is fitted with the bushing 503 by means of a groove arranged on the side wall 510 of its receiving passage 501.

As shown in FIG. 5, the side wall 510 of the bolt receiving passage 501 of the adjustment bolt 102 is provided with at least one recess 504 formed by extending inwards. During the process of the bushing 503 being molded on the side wall 510 of the bolt receiving passage 201 of the adjustment bolt 102, as the bushing 503 is cured and formed, a portion of the bushing 503 corresponding to the recess 504 can be embedded in the recess 504, thereby preventing the bushing 503 from releasing from the adjustment bolt 102.

Figure 6:
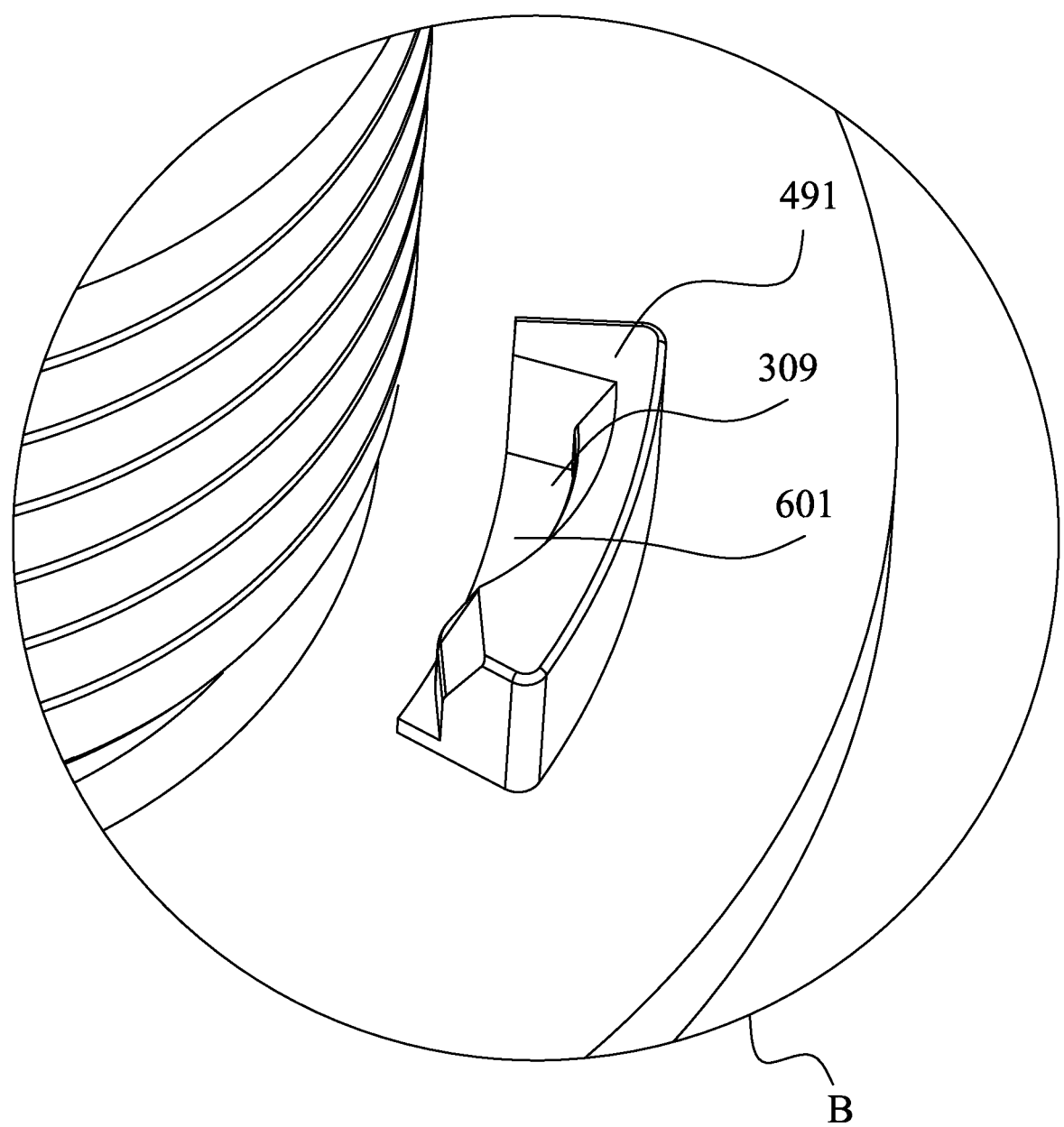
FIG. 6 is a partially enlarged view of portion B in FIG. 3B.

FIG. 6 is a partially enlarged view of portion B in FIG. 3B, showing details of the retaining portion 309. As can be seen from FIG. 6, the head 491 of the retaining portion 309 on the flanged edge 304 of the bushing 203 is configured to be larger in size than the hole 470 in the support flange 252 of the adjustment bolt 102, and thus from the viewing angle of FIG. 6, the hole 470 is blocked out of sight by the head 491.

As shown in FIG. 6, the inner side of the head 491 of the retaining portion 309 is provided with a groove 601, and the outer side of the lower end (i.e., the end opposite to the upper end where the first retaining arm 212 and the second retaining arm 213 are provided) of the mounting nut 101 is provided with a corresponding bump 217 (as seen in FIG. 2). When the nut fastener 100 is in the shortest position (i.e., the adjustment bolt 102 is completely screwed into the mounting nut 101), the bump 217 on the outer side of the lower end of the mounting nut 101 may come into contact with the head 491 of the retaining portion 309 of the bushing 203, wherein the head 491 extends above the inner surface 255 of the support flange 252. Since the bushing 203 is made of an elastic material, the retaining portion 309 can be deformed such that the bump 217 (see FIG. 2) on the outer side of the mounting nut 101 can enter the groove 601 of the retaining portion 309, so that the adjustment bolt 102 can be prevented from moving (e.g., rotating) with respect to the mounting nut 101 by the fitting between the bump 217 and the groove 601 of the retaining portion 309.

Moreover, for ease of use by a user, during transportation of the nut fastener 100, the adjustment bolt 102 and the mounting nut 101 are assembled such that the nut fastener 100 is in the shortest position (i.e., the adjustment bolt 102 is completely screwed into the mounting nut 101). By providing the bump 217 on the outer side of the mounting nut 101 and the groove 601 of the retaining portion 309 as described above, the nut fastener 100 can be prevented from getting longer or the adjustment bolt 102 can be prevented from releasing and separating from the mounting nut 101 due to the relative rotation between the adjustment bolt 102 and the mounting nut 101 during transportation. It should be noted that the shortest position of the nut fastener 100 referred to in the present application is not necessarily the position where the lower end of the mounting nut 101 tightly abuts against the upper surface of the adjustment bolt 102, and a small gap may also be remained between the two.

Figure 7:
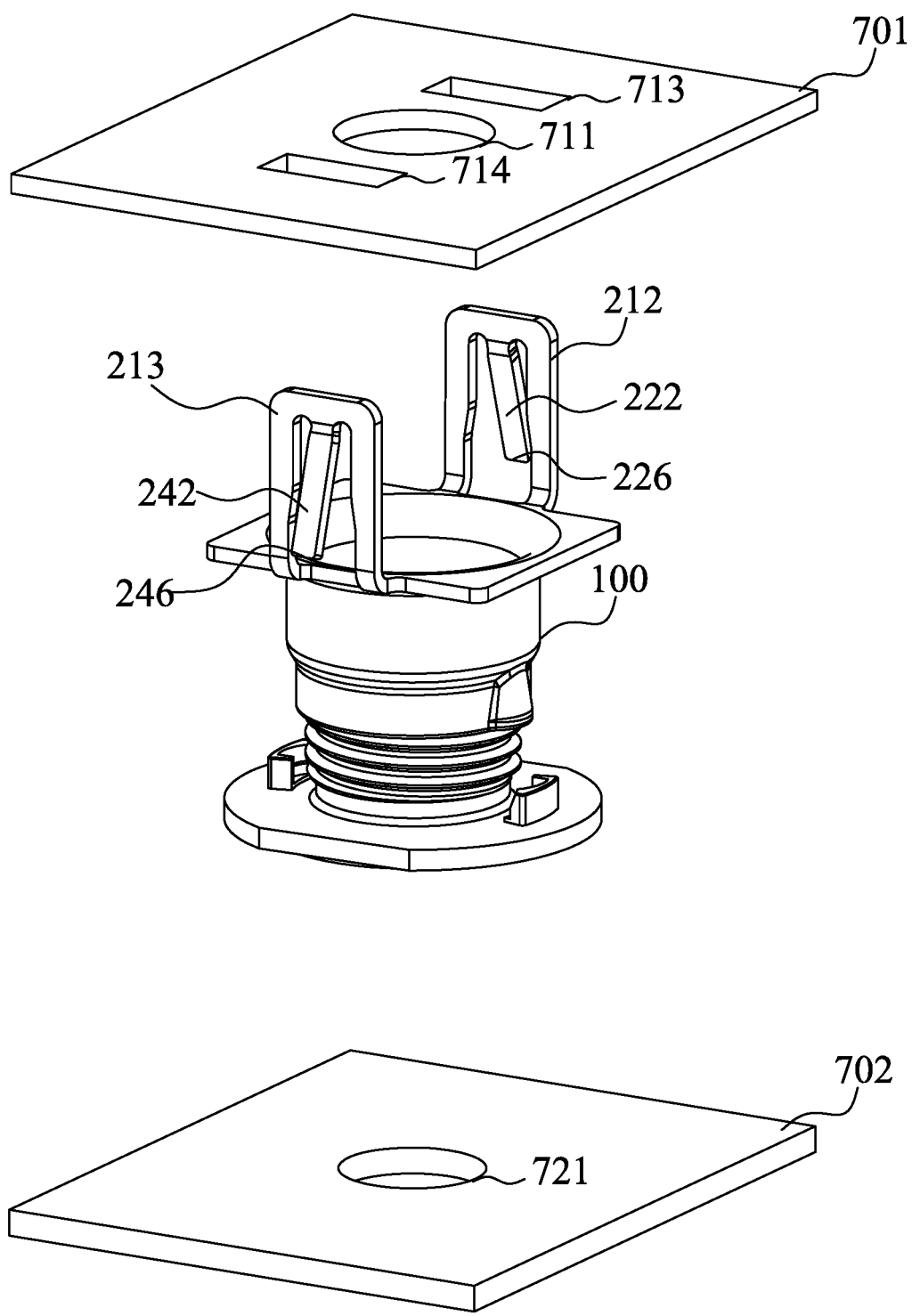
FIG. 7 is a stereoscopic schematic view of the nut fastener of the present application and two panels.

FIG. 7 shows the nut fastener 100 and two panels to be secured. As shown in FIG. 7, the nut fastener 100 is mounted between a first panel 701 and a second panel 702, wherein the first panel 701 has a central hole 711, a first side hole 713 and a second side hole 714, and the second panel 702 has a central hole 721. The first side hole 713 and the second side hole 714 of the first panel 701 are configured for receiving the first retaining arm 212 and the second retaining arm 213 of the nut fastener 100, respectively. The central hole 711 of the first panel 701 and the central hole 721 of the second panel 702 are aligned with the cavity 305 of the bushing 203 of the nut fastener 100 to receive a fastener or a mounting tool.

The process of mounting the nut fastener 100 from the state shown in FIG. 7 to an initial mounting state shown in FIG. 8A will be described below. First, the first retaining arm 212 and the second retaining arm 213 of the nut fastener 100 are respectively inserted into the first side hole 713 and the second side hole 714 of the first panel 701 such that the offset portion 222 and the offset portion 242 are deformed, and the free end 226 and the free end 246 are deflected inwards until the free end 226 and the free end 246 pass through the first side hole 713 and the second side hole 714, respectively. At this time, the offset portion 222 and the offset portion 242 are restored to the original shape, and the free end 226 and the free end 246 abut against the first panel 701 such that the nut fastener 100 cannot release from the first panel 701. The first panel 701 mounted with the nut fastener 100 is then moved and secured in a mounting position near the second panel 702, and the fastener or the mounting tool is inserted into the cavity 305 of the bushing 203 of the nut fastener 100 from the central hole 721 of the second panel 702, so as to obtain the initial mounting state shown in FIG. 8A.

Figure 8A:
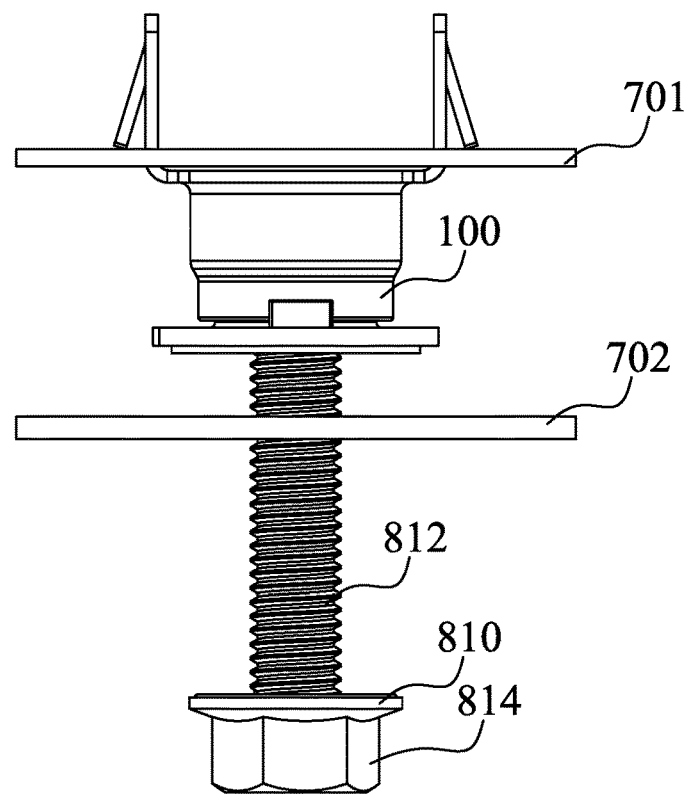
FIG. 8A is a schematic view showing the nut fastener of the present application, in an initial state, mounted on the first panel.
Figure 8B:
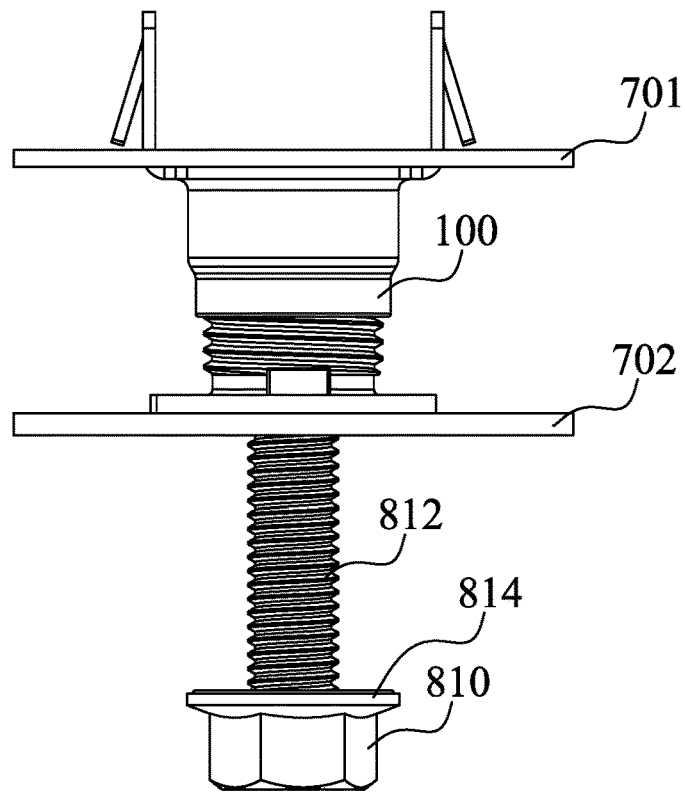
FIG. 8B is a schematic view showing the nut fastener of the present application abutting between the first panel and the second panel.
Figure 8C:
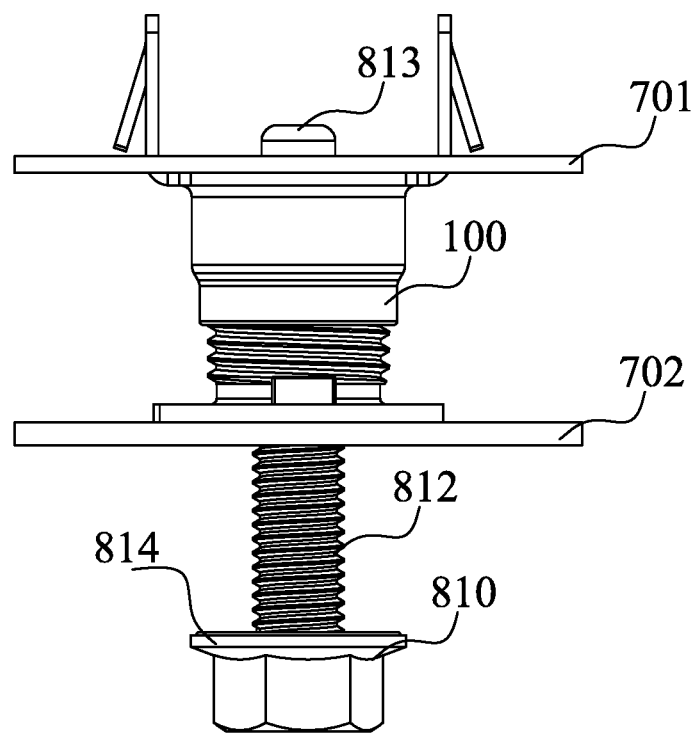
FIG. 8C is a schematic view showing a mounting bolt passing through the nut fastener of the present application.
Figure 8D:
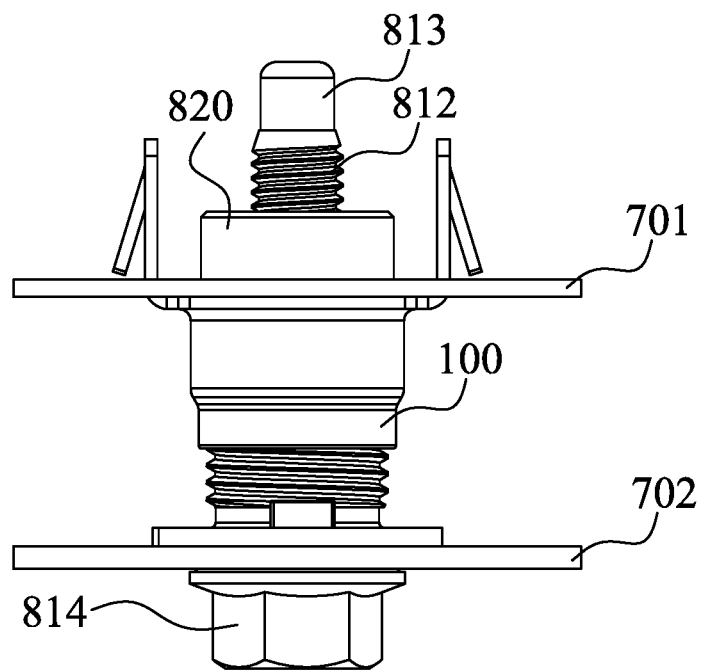
FIG. 8D is a schematic view showing a mounting bolt securing the nut fastener between two panels.

FIGS. 8A to 8D show the mounting process of the nut fastener 100, in which FIG. 8A shows the initial mounting state of the nut fastener 100, FIGS. 8B and 8C show the intermediate mounting states of the nut fastener 100, and FIG. 8D shows the final mounting state of the nut fastener 100. In FIGS. 8A-8D, the fastener 810 is used to mount the nut fastener 100. The fastener 810 comprises a threaded rod 812 and a head 814 arranged at one end of the threaded rod 812. The threaded rod 812 also has a free end 813 (see FIG. 8C).

As shown in FIG. 8A, in the initial mounting state of the nut fastener 100, the fastener 810 is sequentially inserted into the central hole 721 of the second panel 702 and the cavity 305 of the bushing 203 of the nut fastener 100. At this time, the threaded rod 812 of the fastener 810 is in contact with the inner surface of the bushing 203 (i.e., the side wall of the cavity 305). The fastener 810 is then rotated. The threaded rod 812, the external thread of the adjustment bolt 102 and the internal thread of the mounting nut 101 are configured such that when the threaded rod 812 of the fastener 810 is rotated and gradually screwed into the bushing 203, the friction force between the bushing 203 and the threaded rod 812 causes the adjustment bolt 102 to move towards the second panel 702 as the fastener 810 rotates, until it is blocked from continuously moving downwards by the second panel 702, i.e., reaching the position shown in FIG. 8B.

As shown in FIG. 8B, at this time, the flanged edge 304 of the bushing 203 is in contact with the second panel 702, wherein the flanged edge 304 covers the support surface 254 of the support flange 252 of the adjustment bolt 102. Also, since the adjustment bolt 102 is blocked from continuously moving downwards by the second panel 702, even if the fastener 810 continues to rotate, the adjustment bolt 102 is no longer enabled to rotate with respect to the mounting nut 101. The fastener 810 continues to rotate in the position shown in FIG. 8B, and the fastener 810 will continue to rotate with respect to the adjustment bolt 102 to move upwards and pass through the cavity 305 of the bushing 203 and the central hole 711 of the first panel 701, reaching the position as shown in FIG. 8C.

As shown in FIG. 8C, in this position, an operator can access the free end 813 of the threaded rod 812 of the fastener 810 from above the first panel 701. At this time, the nut fastener 100 is stationary with respect to the first panel 701 and the second panel 702, while the fastener 810 can continue to move upwards with respect to the nut fastener 100 until the position shown in FIG. 8D is reached.

As shown in FIG. 8D, in this position, the head 814 of the fastener 810 abuts against the lower surface of the second panel 702 such that the fastener 810 can no longer continue to move upwards with respect to the nut fastener 100. At least a portion of the threaded rod 812 is located above the first panel 701. At this time, the operator can mount and tighten the nut 820 to be fitted with the threaded rod 812 onto the threaded rod 812 from the free end 813 of the threaded rod 812, so that once the nut fastener 100 is completely mounted, the nut fastener 100, the first panel 701 and the second panel 702 can be fixed together.

Since the nut fastener 100 is supported between the first panel 701 and the second panel 702, the nut fastener 100 applies a tension force to the first panel 701 and the second panel 702, and the tension force can be understood as a force pushing the first panel 701 and the second panel 702 away from each other. Thus, if the tension force is too large, the first panel 701 and the second panel 702 are prone to deformation. The structure of the nut fastener 100 of the present application is configured such that the nut fastener 100 will not apply an undesirable excessive tension force to the first panel 701 and the second panel 702 when the nut fastener 100 of the present application is used.

Specifically, in one aspect, in the present application, since the bushing 203 of the present application is made of an elastic material, and the bushing 203 is provided with the flanged edge 304 that can at least partially cover the support surface 254 of the support flange 252 of the adjustment bolt 102, the support surface 254 of the support flange 252 of the adjustment bolt 102 is in contact with the second panel 702 via the flanged edge 304 made of the elastic material, rather than directly contact with the second panel 702. Thus, in contrast to the support surface 254 of the support flange 252 of the adjustment bolt 102 being in direct contact with the second panel 702, in the present application, when the adjustment bolt 102 moves downwards until the flanged edge 304 of the bushing 203 is in contact with the second panel 702, a larger friction force is generated between the flanged edge 304 and the second panel 702, and the friction force can quickly prevent the adjustment bolt 102 from continuing to move downwards as soon as the flanged edge 304 just comes into contact with the second panel 702. In another aspect, since the bushing 203 of the present application is integrally molded in the bolt receiving passage 201 of the adjustment bolt 102 by means of the elastic material, the bushing 203 of the present application can enable the amount of interference between the threaded rod 812 of the fastener 810 and the bushing 203 to be in an appropriate range. Thus, during the movement from FIG. 8B to FIG. 8D, the appropriate amount of interference between the two components enables the threaded rod 812 of the fastener 810 to easily pass through the bushing 203 in contact therewith as it rotates and moves upwards with respect to the adjustment bolt 102, so that an appropriate torque can be applied to the adjustment bolt 102. Both of the above aspects enable the tension force applied to the first panel 701 and the second panel 702 by the nut fastener 100 of the present application to be within an appropriate range.

Once the nut fastener 100 is mounted in place between the first panel 701 and the second panel 702, the flanged edge 304 tightly abuts against the second panel 702. Since the flanged edge 304 is made of an elastic material, a certain deformation can occur to fill up the gap between the adjustment bolt 102 and the second panel 702, so that the flanged edge 304 can prevent water from entering the gap between the adjustment bolt 102 and the second panel 702, and thus has a waterproof function.

Although only some features of the present application have been illustrated and described herein, those skilled in the art may make various improvements and changes. Therefore, it should be understood that the appended claims intend to cover all the foregoing improvements and changes that fall within the substantive spirit and scope of the present application.

The invention claimed is:

1. A nut fastener, comprising:
   a mounting nut including retaining arms and a nut receiving passage; and
   an adjustment bolt, configured to be at least partially received in the nut receiving passage, the adjustment bolt comprising a bolt receiving passage in which a bushing is provided, the bushing being overmolded onto a side wall of the bolt receiving passage via injection molding,
   wherein the adjustment bolt comprises a support flange that is arranged at one end of the adjustment bolt and extends outwardly from an outer surface of the adjustment bolt, and
   wherein the bushing comprises a flanged edge that at least partially covers a support surface of the support flange of the adjustment bolt.

2. The nut fastener of claim 1, wherein the bushing is provided with a cavity configured to receive one or more of a mounting tool and a fastener.

3. The nut fastener of claim 1, wherein the bushing is made of a thermoplastic elastomer.

4. The nut fastener of claim 1, wherein:
the support flange defines a hole, and
the flanged edge comprises a retaining portion extending through the hole.

5. The nut fastener of claim 4, wherein:
an inner side of the retaining portion is provided with a groove, and
an outer side wall of the mounting nut is provided with a bump capable of entering the groove to prevent rotation between the mounting nut and the adjustment bolt.

6. The nut fastener of claim 1, wherein:
an inner wall of the bolt receiving passage has a projecting portion, and
the projecting portion is embedded in the bushing during the injection molding of the bushing.

7. The nut fastener of claim 1, wherein:
an inner wall of the bolt receiving passage defines a groove, and
a wall of the bushing is embedded in the groove during the injection molding of the bushing.

8. The nut fastener of claim 1, wherein an edge of the support flange has a pair of straight sides arranged opposite to each other.

9. The nut fastener of claim 1, wherein:
the nut receiving passage has an internal thread,
an outer wall of the adjustment bolt has an external thread, and
the adjustment bolt is threaded into the nut receiving passage.

10. The nut fastener of claim 1, wherein:
the mounting nut is configured to be mounted on a first panel via the retaining arms, and
the adjustment bolt is rotated relative to the mounting nut such that the nut fastener can support the first panel and a second panel.

11. A fastening assembly, comprising:
a first panel;
a second panel; and
a nut fastener mounted between the first panel and the second panel, the nut fastener comprising:
  a mounting nut including retaining arms and a nut receiving passage; and
  an adjustment bolt, configured to be at least partially received in the nut receiving passage, the adjustment bolt comprising a bolt receiving passage in which a bushing is provided, the bushing being overmolded onto a side wall of the bolt receiving passage via injection molding,
wherein the adjustment bolt comprises a support flange that is arranged at one end of the adjustment bolt and extends outwardly from an outer surface of the adjustment bolt, and
wherein the bushing comprises a flanged edge that at least partially covers a support surface of the support flange of the adjustment bolt.

12. The fastening assembly of claim 11, wherein the flanged edge of the bushing is in contact with the second panel.

13. The fastening assembly of claim 12, wherein the flanged edge of the bushing is configured to deform in order to fill up a gap between the adjustment bolt and the second panel, so that the flanged edge can prevent water from entering the gap between the adjustment bolt and the second panel.

14. The fastening assembly of claim 11, wherein the retaining arms extend through the first panel, and wherein the retaining arms secure the nut fastener to the first panel.

15. The fastening assembly of claim 14, wherein the adjustment bolt is rotated relative to the mounting nut such that the nut fastener can support the first panel and the second panel.

16. The nut fastener of claim 11, wherein the bushing is provided with a cavity configured to receive one or more of a mounting tool and a fastener.

17. The nut fastener of claim 11, wherein the bushing is made of a thermoplastic elastomer.

18. The nut fastener of claim 11, wherein:
the support flange defines a hole, and
the flanged edge comprises a retaining portion extending through the hole.

19. The nut fastener of claim 11, wherein:
an inner wall of the bolt receiving passage has a projecting portion, and
the projecting portion is embedded in the bushing during the injection molding of the bushing.

20. The nut fastener of claim 11, wherein:
an inner wall of the bolt receiving passage defines a groove, and
a wall of the bushing is embedded in the groove during the injection molding of the bushing.

\* \* \* \* \*